June 26, 1962      G. L. HARDEN      3,041,043

LINE PULL-THROUGH DEVICE

Filed March 3, 1961

*INVENTOR.*
GEORGE L. HARDEN
BY
Kane, Dalsimer and Kane

United States Patent Office 3,041,043
Patented June 26, 1962

3,041,043
LINE PULL-THROUGH DEVICE
George L. Harden, 46 Latham Ridge, Latham, N.Y.
Filed Mar. 3, 1961, Ser. No. 93,228
3 Claims. (Cl. 254—134.3)

This invention relates to a device for pulling a line through a conduit. In the construction and building industries, as well as related industries, it often becomes necessary to pass a line through a conduit from one end of the conduit to the other. The line being passed is generally flexible and the conduit lengthy. As a result, it is very difficult to pass the line through the length of the conduit. Various devices and implements are presently available to aid in the accomplishment of this. For the most part, such devices have been cumbersome to work with and wholly unsatisfactory for the successful accomplishment of the task. The difficulties result principally from the resiliency of the line being passed through the conduit. Hooks have been used wherein a hook is attached to one end of the line to be passed through the conduit and the line, hook first, extended into the conduit. A like hook is then extended into the other end of the conduit by means of a second line, such as a resilient fish tape, and an attempt made to join the hooks so that the line can be pulled through the conduit. Such a method is very cumbersome and requires a good deal of patience by the user since the hooks can easily pass one another within the conduit and many attempts at "hooking" must be made before the hooks are joined successfully so that the line can be pulled through the conduit.

The invention herein disclosed has as its principal object the furnishing of a line pull-through device, the use of which will enable unskilled persons to successfully trap the free end of a line and pull it through a conduit with a minimum of effort.

A line pull-through device embodying the invention and the manner of using the same is described herein with references to the drawings in which.

Figure 1:
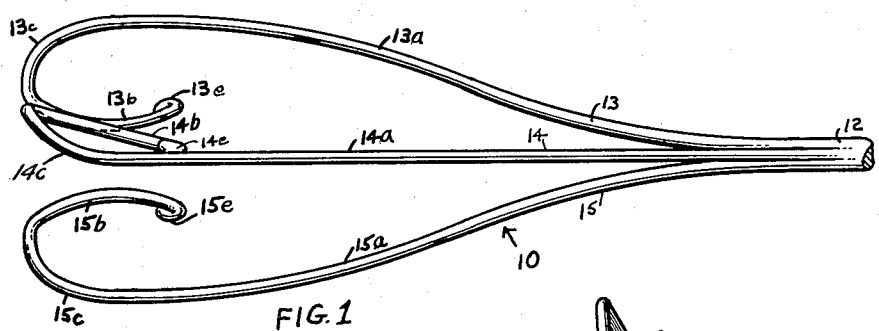
FIG. 1 is a side view of one-half of a line pull-through device constructed in accordance with the teachings of this invention.

In the figs. a line pull-through device is shown consisting of two identical sections indicated generally by the numerals 10 and 11. Section 10 is shown in FIG. 1 as viewed from the side thereof and since section 11 is identical thereto a description of section 10 will suffice to completely and accurately describe section 11 as well. Line pull-through device section 10 is a unitary member having a stem 12 and three branches extending outwardly therefrom to the left in FIG. 1. The branches of section 10 are indicated in the figs. by the numerals 13, 14 and 15. The right end of stem 12, as illustrated in FIG. 1, has been removed and it is contemplated that this end of the stem will be provided with suitable means for attaching section 10 to a line or other resilient member as will become clear as the method of using the line pull-through device is fully described.

Figure 2:
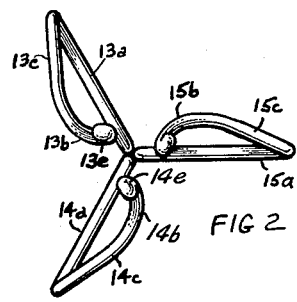
FIG. 2 is a face end view of the portion of the device shown in FIG. 1.

Each of the branches 13, 14 and 15 is identical and continually curves to form three portions indicated in the drawings by the letters *a*, *b* and *c*. Thus, the main portion of branch 15 is indicated by the numeral 15*a*, the end portion by the numeral 15*b* and the central portion by the numeral 15*c*. The portions of branches 13, 14 and 15 are likewise indicated so that branch 13 consists of portions 13*a*, 13*b* and 13*c*, and branch 14 consists of portions 14*a*, 14*b* and 14*c*. Considering a portion of any one of the branches 13, 14 or 15, it is seen that this portion forms a graceful, long S in a single plane. In FIG. 1, portion 14*a* forms the S configuration in the plane perpendicular to the paper and portion 15*a* illustrates the S configuration. Portion 13*a* is likewise formed. In FIG. 2 it is seen that portions 13*a*, 14*a* and 15*a* have S configurations in planes which intersect to form an angle of 120° between adjacent planes. The plane of each of the *c* portions of the branches forms with the plane of its respective *a* portion an angle less than 90° and preferably less than 30° but greater than 10°. Excellent results have been attained by utilizing branches formed with a 25° angle between the planes of their *a* and *c* portions. Each of the *b* portions of the branches is turned inwardly out of the plane of its respective *c* portion and toward the plane of its respective *a* portion, although the free end of the *b* portion does not enter completely the plane of its respective *a* portion. Each of the *b* portions defines throughout its length a camming surface, the purpose of which will be considered below and each of the *b* portions terminates in a rounded or turned-back end indicated in the figs. by the letter *e* together with the respective numeral. Thus, the free end of portion 14*b* is indicated in the figs. by 14*e*, the free end of portion 13*b* is indicated in the figs. by 13*e* and the free end of portion 15*b* is indicated in the figs. by 15*e*.

Figure 3:
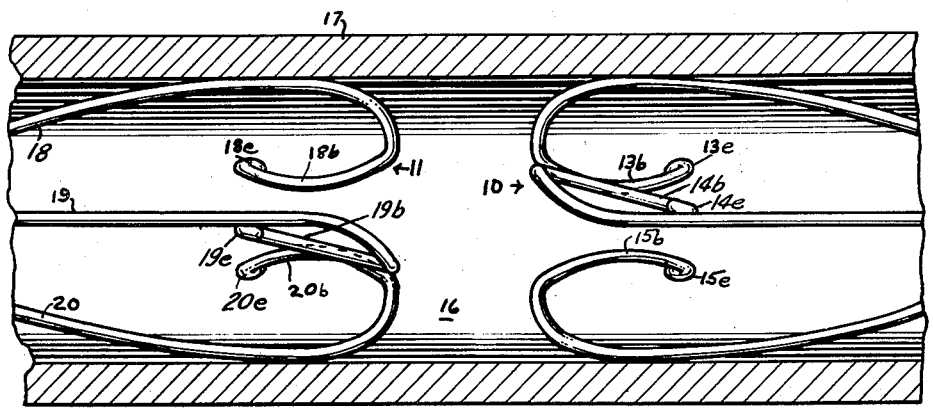
FIG. 3 is a segmentary view of the line pull-through device of this invention within a conduit.
Figure 4:
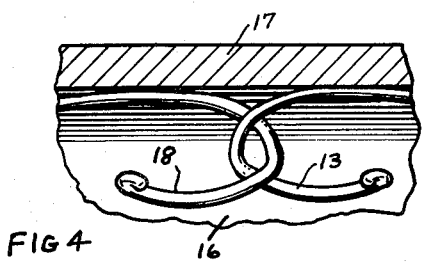
FIG. 4 is a segmentary view of the interconnecting portions of the line pull-through device within a conduit.

In FIG. 3, two sections of a line pull-through device—sections 10 and 11, respectively, are shown in faced relation within the cylindrical central opening 16 of conduit 17. In the use of the line pull-through device which is the subject of this invention, it is contemplated that one of the sections thereof, section 11, for example, be attached to the end of the line to be pulled through the conduit with the branches directed away from the line. It is further contemplated that a like line or other elongated member be provided at its end with section 10 of the line pull-through device and that section 10 have the branches thereof directed away from the member to which the section is attached from the elongated member. Section 11 is then inserted, branches first, within the conduit through which the line attached thereto is to be pulled. The line with section 10 is pushed into the conduit, such as conduit 17, a distance. Section 10 is then inserted in conduit 17, branches first, and pushed into the conduit toward section 11 until a point is reached such as that shown in FIG. 3 wherein the branches of section 10 and the branches of section 11 are facing one another with a short space therebetween. The dimensions of sections 10 and 11 are such that a surface of each of the *a* portions of the branches contacts the periphery of hollow 16.

The sections, upon reaching the position as shown in FIG. 3, are then moved toward one another and because of the configuration of the branches corresponding surfaces *b* cam against one another until associated ends *e* pass one another. Continuing to move section 10 to the left and section 11 to the right as seen in FIG. 3 will result in a point being reached where further movement will be prevented since the respective *c* portions will be blocked by respective *a* portions of the branches on the other line pull-through section. For example, considering FIG. 3, if section 11 is maintained stationary and section 10 moved to the left, surfaces 13*b*, 14*b* and 15*b* will cam against and slide over corresponding surfaces 18*b*, 19*b* and 20*b* of branches 18, 19 and 20 of section 11 until the ends 13*e*, 14*e* and 15*e* have been moved to the left of ends 18*e*, 19*e* and 20*e*. Further movement of branches 13, 14 and 15 to the left will be prevented by branches 18, 19 and 20. Reversing the movement of section 10 at this point so that section 10 is then moved to the right will result in corresponding portions of section 10 linking corresponding portions of sections 11. As illustrated in FIG. 3, branch 13 is shown with a portion thereof linking branch 18; branch 14 will likewise link with branch 19 and branch 15 will likewise link with branch 20. Continual movement of section 10 to the right will pull section 11 to the right and through the conduit, and at the same time pull the line attached to section 11 through the conduit.

Thus, a line pull-through device has been disclosed, the configuration of which eliminates the necessity of probing in order to "hook" a line within a conduit and the configuration of the sections will prevent the sections from sliding past one another in a conduit and will easily enable the interlinking of sections so that a line attached to one of the sections can be readily pulled through the conduit.

Thus, among others, the object of the invention has been achieved. Obviously, numerous changes in construction and rearrangement of parts might be resorted to without departing from the scope of the invention as defined by the claims.

I claim:

1. A device for pulling a line through a conduit including a pair of identical device sections each consisting of a resilient stem and a plurality of resilient branch members extending radially and axially away from said stem in intersecting planes within the conduit so that the diameter thereof is controlled by the diameter of the conduit and each of said resilient members being formed of a main portion having an S configuration in a single plane, a central portion lying in a plane forming an angle with the plane of the main portion and an end portion turned out of the plane of said central portion toward the plane of said main portion whereby upon movement of said identical device sections of said pair toward each other said branch members said respective device sections being confined by the conduit and resilient will override and interlink upon attempted movement of said device sections away from each other.

2. A device for pulling a line through a conduit in accordance with claim 1 in which the respective planes of each central portion and associated main portion form an angle between 90° and 10°.

3. A device for pulling a line through a conduit in accordance with claim 1 in which associated central portions and main portions lie in planes respectively forming an angle of 25°.

References Cited in the file of this patent

UNITED STATES PATENTS 1,658,887     Dotzauer _____ Feb. 14, 1928